(12) United States Patent
Park et al.

(10) Patent No.: US 10,903,927 B2
(45) Date of Patent: Jan. 26, 2021

(54) APPARATUS AND METHOD FOR ESTIMATING OVSF CODE

(71) Applicant: AGENCY FOR DEFENSE DEVELOPMENT, Daejeon (KR)

(72) Inventors: Cheolsun Park, Daejeon (KR); Dongwoo Kim, Daejeon (KR); Dongweon Yoon, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 16/298,940

(22) Filed: Mar. 11, 2019

(65) Prior Publication Data

US 2020/0220639 A1 Jul. 9, 2020

(30) Foreign Application Priority Data

Jan. 3, 2019 (KR) .................. 10-2019-0000817

(51) Int. Cl.
*H04J 13/00* (2011.01)
*H04L 25/02* (2006.01)

(52) U.S. Cl.
CPC ...... *H04J 13/0044* (2013.01); *H04L 25/0204* (2013.01)

(58) Field of Classification Search
CPC ... H04J 13/0044; H04J 13/00; H04L 25/0204; H04B 1/70735; G10L 2019/0009
See application file for complete search history.

(56) References Cited

U.S. PATENT DOCUMENTS 9,749,155 B1 * 8/2017 Joung .................. H04B 1/707

FOREIGN PATENT DOCUMENTS

KR 10-2004-0042788 A 5/2004
KR 10-1757625 B1 7/2017

* cited by examiner

*Primary Examiner* — Nishant Divecha
(74) *Attorney, Agent, or Firm* — Fenwick & West LLP

(57) ABSTRACT

The present disclosure provides a method for estimating OVSF (orthogonal variable spreading factor) code, the method comprises setting an initial value of a spreading factor and an initial value of an index of the spreading factor; extracting a first reception symbol by dechannelizing a reception signal based on a candidate OVSF code corresponding to the set spreading factor and the set index; acquiring a first code domain power of the first reception symbol; acquiring, if the first code domain power is greater than or equal to a predetermined reference value, variance of power of the first reception symbol which is normalized by the first code domain power; and estimating a used OVSF code based on the variance of the normalized power of the first reception symbol.

8 Claims, 6 Drawing Sheets

APPARATUS AND METHOD FOR ESTIMATING OVSF CODE

CROSS-REFERENCE TO RELATED APPLICATIONS

This application claims priority to Republic of Korean Patent Application No. 10-2019-0000817, filed on Jan. 3, 2019, the entire contents of which is incorporated herein by reference.

TECHNICAL FIELD

The present disclosure relates to an apparatus and a method for estimating an orthogonal variable spreading factor (OVSF) code applied to a reception signal.

BACKGROUND

Wideband code division multiple access (WCDMA), which is one of the third generation (3G) mobile communication systems defined in 3GPP TS.25 standard, is an asynchronous communication system having a chip rate of Fc=3.84 Mcps.

In a WCDMA communication environment, a base station and a terminal share various connection information such as a primary scramble code (PSC), a spreading factor (SF), a transport format combination indicator (TFCI) and the like. Therefore, fast data communication can be performed when decoding a physical layer signal based on the connection information.

In the case of an abnormal operation of the terminal, it is required to acquire the connection information. For example, the connection information can be acquired from a user or extracted from an upper layer signal. However, such a method may cause another abnormal operation, which is not preferable. Therefore, it is important for a signal analyzer to accurately estimate the connection information from the signal without any connection operation.

PRIOR ART

Patent Document

Korean Patent No. 10-0756262 (registered on Aug. 31, 2007)

SUMMARY

In view of the above, the present disclosure provides an apparatus and a method for estimating a used OVSF code based on power variance of a reception symbol for a candidate OVSF code.

The drawbacks to be solved by the present disclosure are not limited to the aforementioned drawbacks, and other drawbacks that are not mentioned will be clearly understood by those skilled in the art.

In accordance with an aspect of the present disclosure, there is provided a method for estimating OVSF (orthogonal variable spreading factor) code including: setting an initial value of a spreading factor and an initial value of an index of the spreading factor; extracting a first reception symbol by dechannelizing a reception signal based on a candidate OVSF code corresponding to the set spreading factor and the set index; acquiring a first code domain power of the first reception symbol; acquiring, if the first code domain power is greater than or equal to a predetermined reference value, variance of power of the first reception symbol which is normalized by the first code domain power; and estimating a used OVSF code based on the variance of the normalized power of the first reception symbol.

Further, the estimating the used OVSF code may include: extracting a second reception symbol from the reception signal based on a parent OVSF code and a child OVSF code of the candidate OVSF code; acquiring a second code domain power of the second reception symbol; acquiring, if the second code domain power is greater than or equal to the reference value, variance of power of the second reception symbol that is normalized by the second code domain power; and estimating the used OVSF code based on the variance of the normalized power of the first reception symbol and the variance of the normalized power of the second reception symbol.

Further, the estimating the used OVSF code based on the variance of the normalized power of the first reception symbol and the variance of the normalized power of the second reception symbol, an OVSF code corresponding to a smaller variance between the variance of the normalized power of the first reception symbol and the variance of the normalized power of the second reception symbol may be estimated as the used OVSF code.

Further, the method may be further comprising, after said estimating the used OVSF code, changing at least one of the set spreading factor and the set index.

Further, the changing at least one of the set spreading factor and the set index may include: changing the set index to an index of an OVSF code having a parent OVSF code or a child OVSF code that is not used for acquiring the variance among a plurality of indices of the set spreading factor.

Further, the changing at least one of the set spreading factor and the set index may include: changing, when there is no OVSF code having a parent OVSF code or a child OVSF code that is not used for acquiring the variance among a plurality of OVSF codes corresponding to the set spreading factor, the set spreading factor to a spreading factor smaller than the set spreading factor.

Further, the changing at least one of the set spreading factor and the set index further may include: stopping changing of the set spreading factor when the set spreading factor is smaller than or equal to a predetermined threshold spreading factor.

Further, the extracting the first reception symbol, if at least one of the set spreading factor and the set index is changed, the first reception symbol may be extracted based on the changed setting.

In accordance with another aspect of the present disclosure, there is provided an apparatus for estimating OVSF (orthogonal variable spreading factor) code including: a setting unit configured to set an initial value of a spreading factor and an initial value of an index of the spreading factor; an extraction unit configured to extract a first reception symbol by dechannelizing a reception signal based on a candidate OVSF code corresponding to the set spreading factor and the set index; a CDP acquisition unit configured to acquire a first code domain power of the first reception symbol; a variance acquisition unit configured to acquire, when the first code domain power is greater than or equal to a predetermined reference value, variance of a power of the first reception symbol that is normalized by the first code domain power; and an estimation unit configured to estimate a used OVSF code based on the variance of the normalized power of the first reception symbol.

In accordance with the embodiment of the present disclosure, the OVSF code applied to the reception signal can be accurately estimated by using power variance of the reception symbol. Particularly, unlike in a method using a zero crossing rate (ZCR), it is not necessary to set a reference value, which makes it possible to reduce the possibility in which an error occurs due to the setting of the reference value and improve the performance of the OVSF code estimation.

BRIEF DESCRIPTION OF THE DRAWINGS

The objects and features of the present disclosure will become apparent from the following description of embodiments, given in conjunction with the accompanying drawings, in which.

DETAILED DESCRIPTION

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

A term such as "unit" or the like disclosed in the specification indicates a unit for processing at least one function or operation, and may be implemented in hardware, software or in combination of hardware and software.

Figure 1:
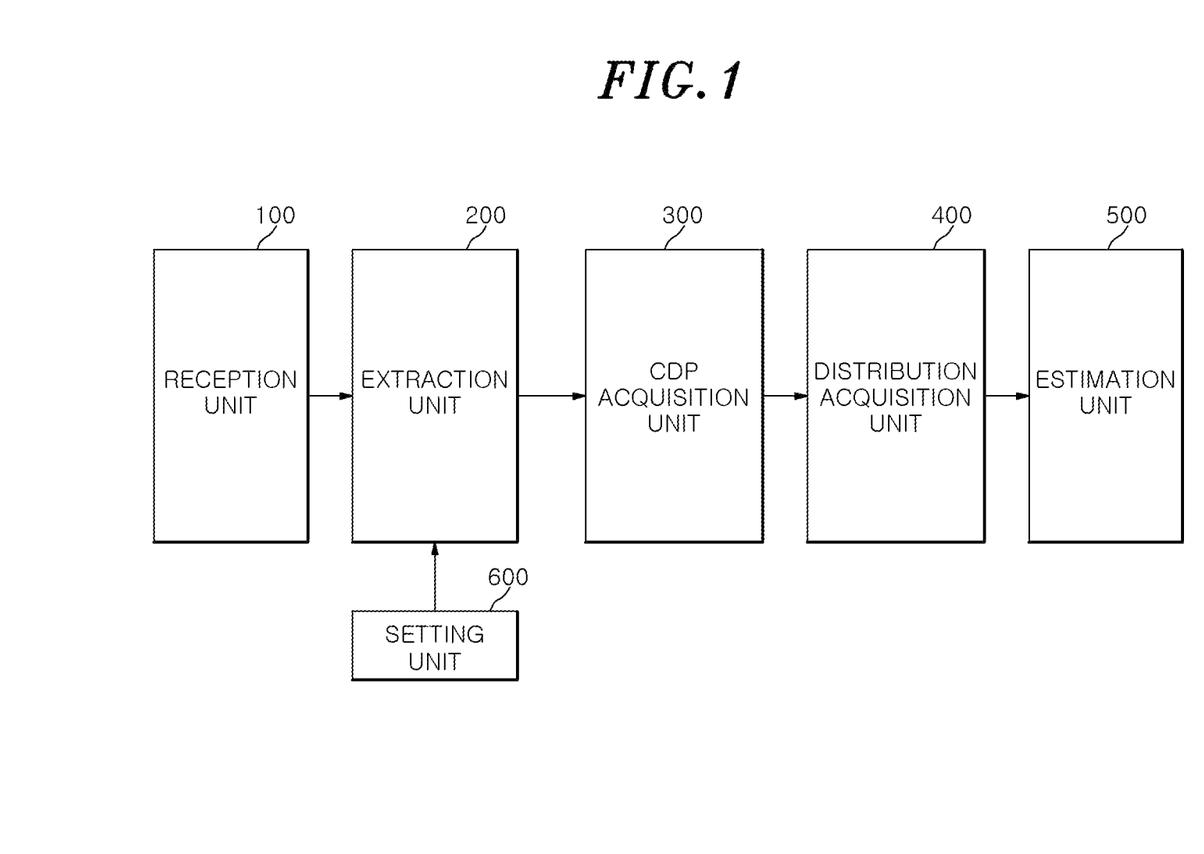
FIG. 1 is a control block diagram of an OVSF code estimation apparatus according to an embodiment of the present disclosure.

FIG. 1 is a control block diagram of an OVSF code estimation apparatus according to an embodiment of the present disclosure.

An OVSF code estimation apparatus of the present disclosure may be any apparatus for estimating an OVSF code applied to a reception signal. The reception signal may be an RF signal as a downward signal transmitted and received based on a CDMA or a WCDMA system.

In the CDMA/WCDMA system, the spreading of each channel includes a channelization operation using a channelization code and a scrambling operation using a scrambling code. Here, the scrambling code is used to identify a base station or a cell, whereas a channelization code is used to distinguish different physical channels (user terminals) in each cell.

In the channelization operation, each data symbol is multiplied by a channelization code that is a binary sequence of 1 and 0 and converted into a plurality of chips. The number of chips per data symbol is referred to as the "spreading factor (SF)." The channelization code may be an OVSF code having a spreading factor from at least 4 to at most 512 (in the case of downlink). In the following description, it is assumed that the number of chips to be converted is 38,400, for convenience of explanation.

When a problem occurs in a communication environment, the OVSF code estimation apparatus needs to estimate an actually used OVSF code in order to acquire a data symbol from a data signal. Any of the OVSF code estimation methods performs despreading by applying candidate OVSF codes to a descrambled data signal, and estimating the used OVSF code by a maximum likelihood method. However, two or more OVSF codes may be estimated because a parent OVSF code and a child OVSF code are not orthogonal. This may result in a decrease in the estimation accuracy.

The actually used OVSF code can also be estimated by another method. For example, the actually used OVSF code can be estimated by acquiring a reception symbol by dechannelizing a reception signal with a candidate OVSF code and comparing a ZCR of a real number value and an imaginary number value of the reception symbol with the reference value. However, in such a method, the estimation performance varies depending on the reference value of the ZCR, which makes it difficult to find the reference value for obtaining the optimal estimation performance.

In order to solve the above problem, the OVSF code estimation apparatus according to an embodiment of the present disclosure estimates the actually used OVSF code based on the power variance of the reception symbol without setting the reference value of the ZCR.

Referring to FIG. 1, the OVSF code estimation apparatus according to an embodiment of the present disclosure may include: a reception unit 100, an extraction unit 200, a CDP acquisition unit 300, a distribution acquisition unit 400, an estimation unit 500, and a setting unit 600. The respective components of the OVSF code estimation apparatus can be implemented as an operation unit including a microprocessor. For example, they can be implemented as a central processing unit (CPU), a graphic processing unit (GPU), or the like. Alternatively, a plurality of components of the OVSF code estimation apparatus can be implemented as a single system on chip (SOC).

The reception unit 100 can receive a reception signal from an external device. The reception unit 100 according to an embodiment can directly receive, as the reception signal, a CDMA/WCDMA downward signal transmitted from a base station to an OVSF code estimation apparatus, or receive, as the reception signal, a CDMA/WCDMA downward signal transmitted to another apparatus. Therefore, the reception unit 100 can be implemented as a communication module capable of receiving the CDMA/WCDMA downward signal.

Alternatively, the reception unit 100 can receive a CDMA/WCDMA downward signal from another device in a wired or a wireless manner. In that case, the reception unit 100 can be implemented as various communication devices capable of communicating with the corresponding device, or can be implemented as a communication interface that can be connected to another communication device.

The extraction unit 200 can extract a reception symbol from the reception signal received by the reception unit 100. Specifically, the extraction unit 200 can extract the reception symbol by dechannelizing the reception signal based on the OVSF code corresponding to a preset spreading factor and a preset index. At this time, the spreading factor and the index can be preset by the setting unit 600.

The extraction unit 200 according to an embodiment can acquire a baseband IQ signal for one frame by down-converting the reception signal received by the reception unit 100 and performing an A/D conversion on the acquired IQ signal. Next, the extraction unit 200 can descramble the A/D converted IQ signal by using an appropriate scrambling code. Finally, the extraction unit 200 can extract the reception symbol by de-spreading the descrambled IQ signal with the OVSF code corresponding to the preset spreading factor and the preset index of the spreading factor.

The CDP acquisition unit 300 can acquire a code domain power (CDP) of the reception symbol. At this time, the CDP may be the average with respect to the power of the extracted reception symbol.

Therefore, the CDP acquisition unit 300 according to an embodiment can acquire the power consumption of each reception symbol. Next, the CDP acquisition unit can acquire the average of the power of the reception symbol as the code domain power.

If the code domain power is greater than or equal to the predetermined reference value, the variance acquisition unit 400 can acquire the variance of the normalized power of the reception symbol. Here, the reference value can be determined based on the maximum value of the code domain power and the length of the spreading factor.

The variance acquisition unit 400 according to an embodiment determines the reference value based on the maximum value of the code domain power and the length of the spreading factor and compares the code domain power with the determined reference value. If the code domain power is greater than or equal to the reference value, it is determined that the OVSF code used for the dechannelization may be the actually used OVSF code, and the power of the reception symbol can be normalized as the code domain power. Finally, the variance acquisition unit 400 can acquire the variance of the normalized power of the reception symbol.

The estimation unit 500 can estimate the OVSF code that was actually applied based on the variance of the normalized power of the reception symbol. Hereinafter, an OVSF code estimating method executed by the OVSF code estimation apparatus according to an embodiment of the present disclosure will be described.

Figure 2A:
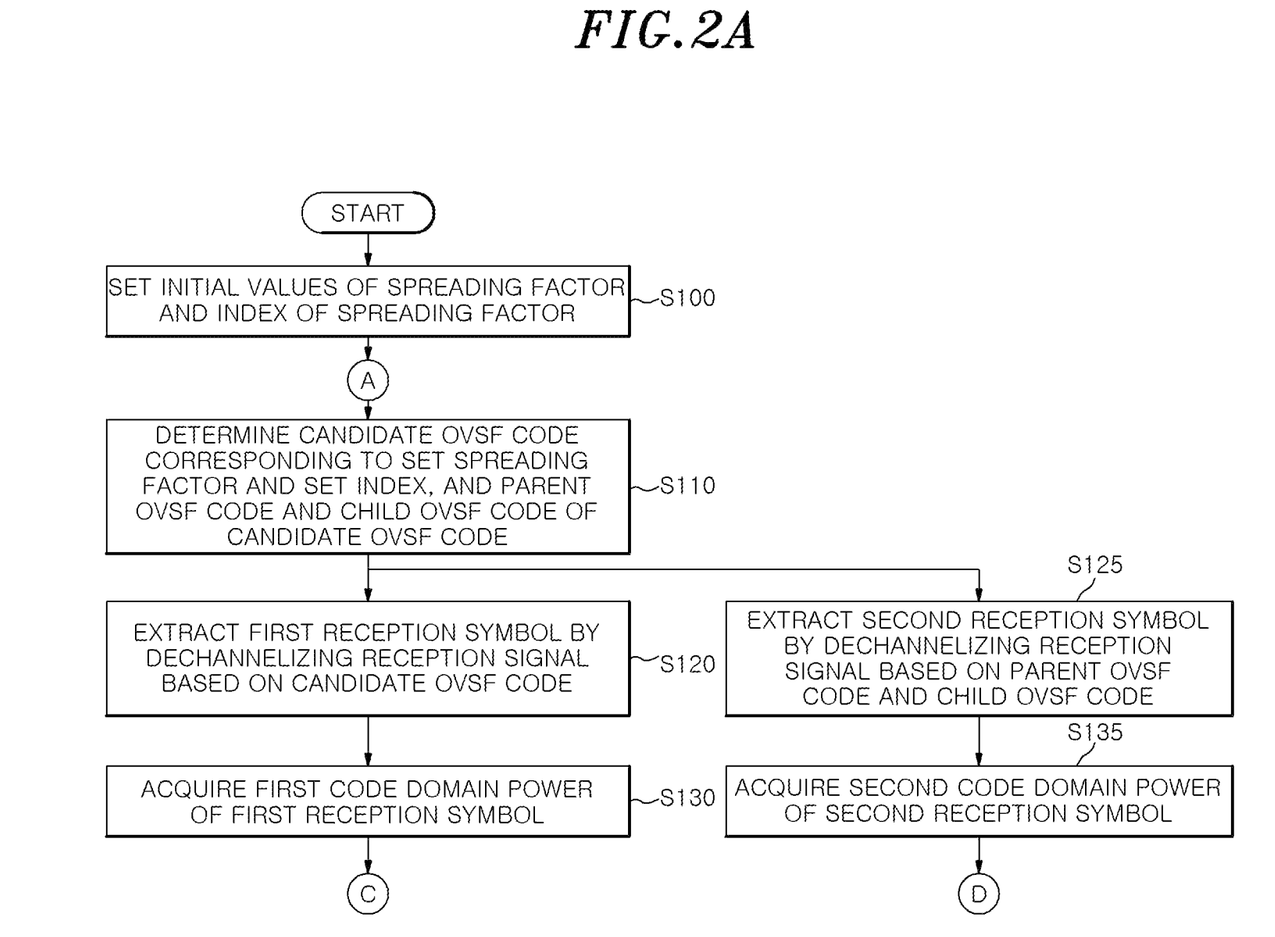
FIGS. 2A, 2B and 3 are flowcharts of an OVSF code estimation method according to an embodiment of the present disclosure.
Figure 2B:
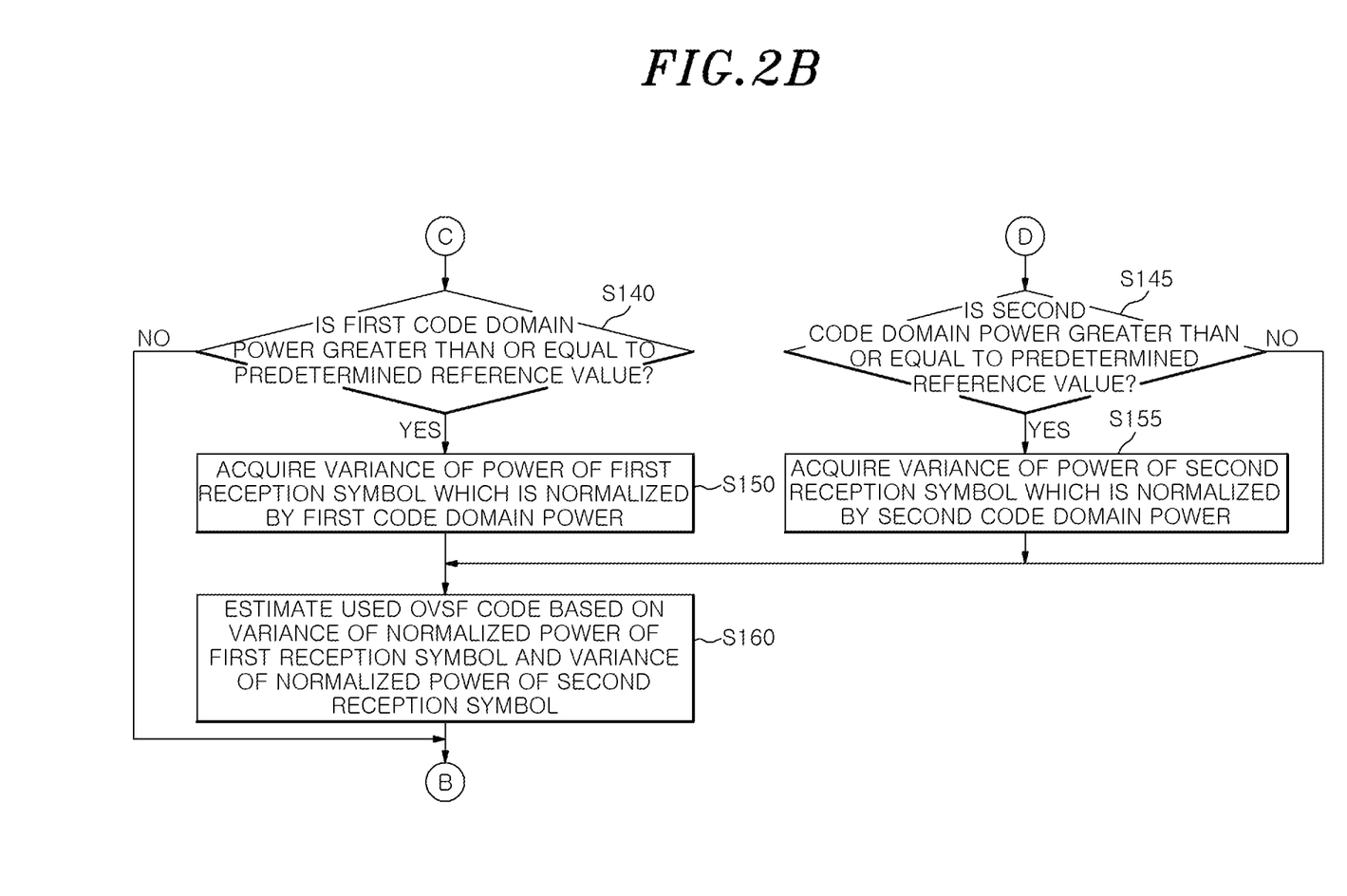
Figure 3:
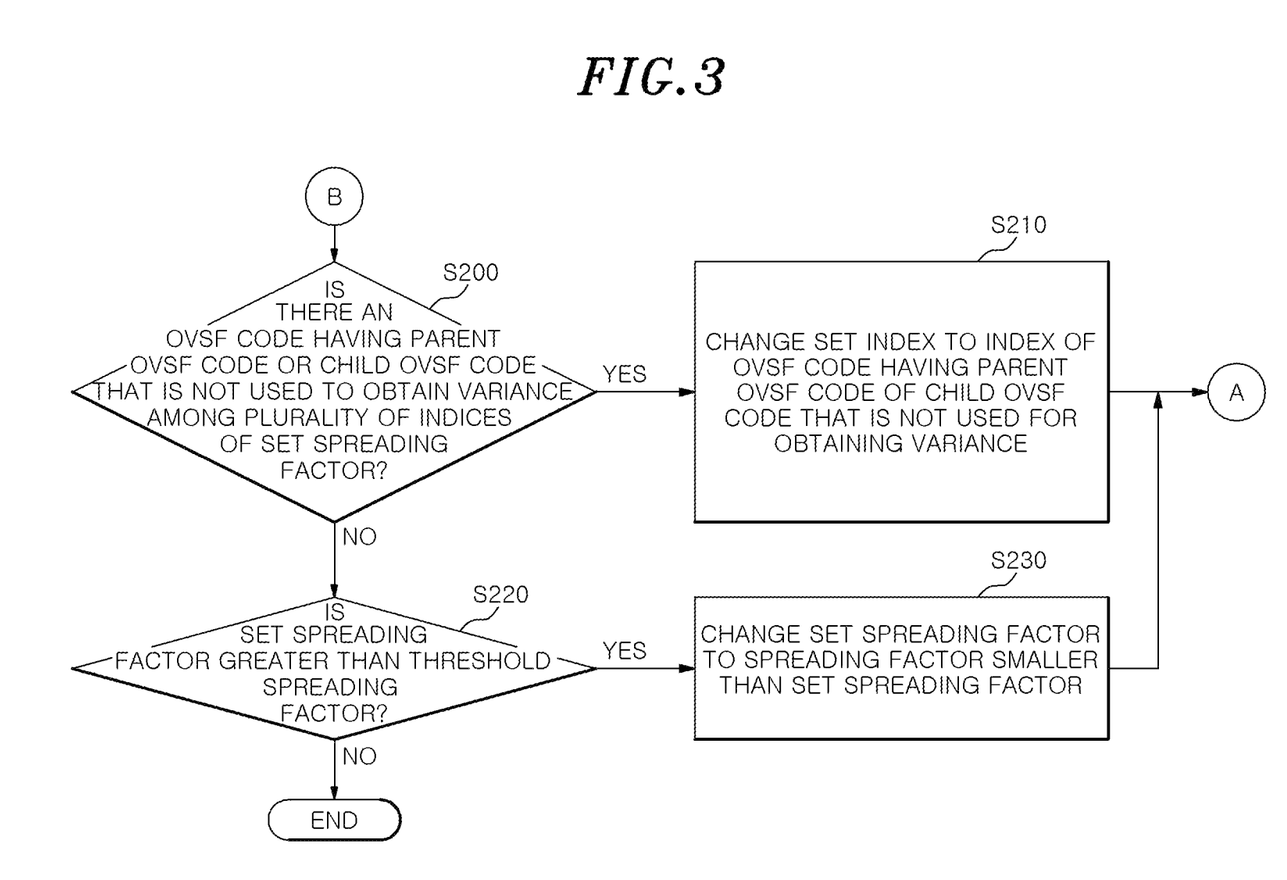

FIGS. 2 and 3 are flowcharts of an OVSF code estimation method according to an embodiment of the present disclosure.

First, the setting unit 600 of the OVSF code estimation apparatus can set initial values of a spreading factor and an index of the spreading factor (S100). In order to examine all the candidate OVSF codes, the setting unit 600 according to an embodiment can set the initial value of the spreading factor SF to 512 and the initial value of the index m to 0.

Next, the extraction unit 200 of the OVSF code estimation apparatus can determine the candidate OVSF code corresponding to the set spreading factor and the set index, and the parent OVSF code and the child OVSF code of the candidate OVSF code (S110). Hereinafter, the relation between the candidate OVSF code and the parent/child OVSF codes of the candidate OVSF code will be described with reference to FIG. 4.

Figure 4:
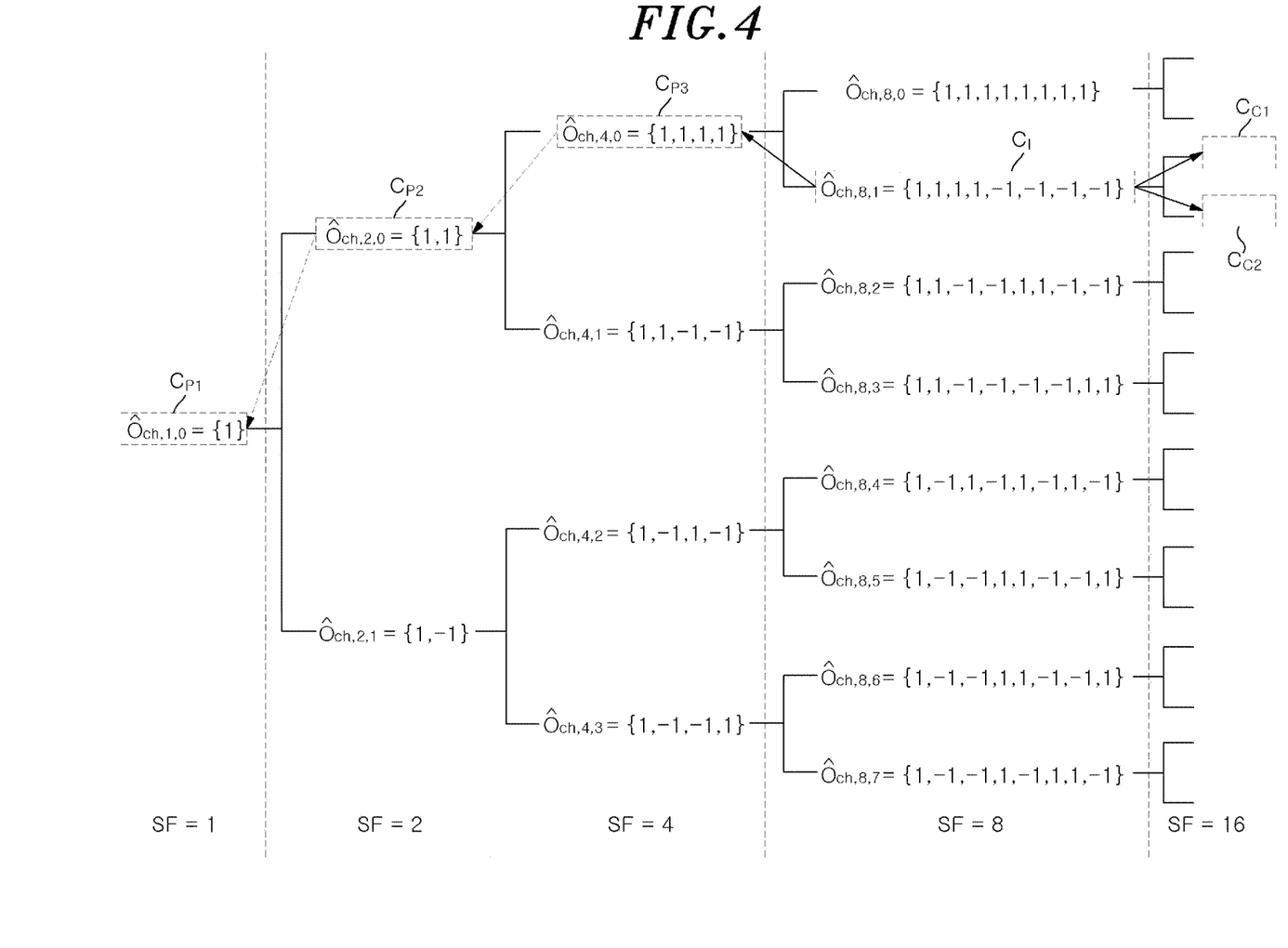
FIG. 4 shows an example of an OVSF code tree structure used by the OVSF code estimation apparatus according to the embodiment of the present disclosure.

FIG. 4 shows an example of an OVSF code tree structure used in the OVSF code estimation apparatus according to an embodiment of the present disclosure. FIG. 4 shows an OVSF code tree in which the spreading factor SF gradually increases from 1. However, in the WCDMA standard, it is defined that the OVSF code tree uses the spreading factor of 4 to 512, and excludes 1 and 2.

In the OVSF codes used by the OVSF code estimation apparatus according to an embodiment of the present disclosure, the codes having the same spreading factor SF may be orthogonal, and the codes having different spreading factors SF may be orthogonal only when a code having a larger spreading factor SF and a code having a smaller spreading factor SF do not satisfy the parent/child OVSF code relation.

Here, the child OVSF code indicates an OVSF code generated from a specific OVSF code among OVSF codes having a spreading factor greater than that of the specific OVSF code. In view of the child OVSF code, the specific OVSF code may be the parent OVSF code.

Referring to FIG. 4, when $\hat{O}_{ch,8,1}$ is set to the reference OVSF code $C_I$, $\hat{O}_{ch,16,2}$ and $\hat{O}_{ch,16,3}$ generated from the reference OVSF code $C_I$ may be the child OVSF codes $C_{C1}$ and $C_{C2}$ of the reference OVSF code $C_I$, respectively. Further, $\hat{O}_{ch,4,0}$, which can generate the reference OVSF code $C_I$, $\hat{O}_{ch,2,0}$, which can generate $\hat{O}_{ch,4,0}$, and $\hat{O}_{ch,1,0}$, which can generate $\hat{O}_{ch,2,0}$, can be parent OVSF codes $C_{P3}$, $C_{P2}$, and $C_{P1}$ of the reference OVSF code $C_I$, respectively.

At this time, the reference OVSF code $C_I$ is orthogonal to $\hat{O}_{ch,2,1}$, but is not orthogonal to the parent OVSF code $C_{P3}$. When the OVSF codes with the spreading factor SF of 8 are compared with $\hat{O}_{ch,2,0}$, the OVSF codes with the index m of 0 to 3 can be generated from $\hat{O}_{ch,2,0}$ and thus are not mutually orthogonal, whereas the OVSF codes with the index m of 4 to 7 cannot be generated from $\hat{O}_{ch,2,0}$ and thus are mutually orthogonal.

Next, the extraction unit 200 of the OVSF code estimation apparatus can extract a first reception symbol by dechannelizing the reception signal based on the candidate OVSF code (S120). Specifically, the extraction unit 200 according to an embodiment acquires a baseband IQ signal for one frame by down-converting the reception signal, performs A/D conversion on the acquired IQ signal, descrambles the A/D converted IQ signal by using an appropriate scrambling code, de-spreads the descrambled IQ signal with an OVSF code corresponding to a preset spreading factor and a preset index of the spreading factor, and extract the reception symbol, as described with reference to FIG. 1.

The first reception symbol $\hat{S}(k;SF,m)$ extracted by the extraction unit 200 can satisfy the following Eq. (1).

$$\hat{S}(k; SF, m) = \frac{1}{SF} \sum_{n=0}^{SF-1} S(k \cdot SF + n)\hat{C}_{ch,SF,m}(n) \quad [\text{Eq. 1}]$$

$$\text{for } k = 0, \ldots, \frac{38400 - SF}{SF}$$

Here, k indicates an index of a reception symbol; SF indicates a spreading factor; m indicates an index of a spreading factor; and $C_{ch,SF,m}(n)$ indicates a candidate OVSF code.

The extraction unit 200 of the OVSF code estimation apparatus can extract a second reception symbol by dechannelizing the reception signal based on the parent OVSF code and the child OVSF code (S125). At this time, the second reception symbol is extracted in the same manner as that described in the step S120.

When the first reception symbol is extracted, the CDP acquisition unit 300 of the OVSF code estimation apparatus can acquire a first code domain power of the first reception symbol (S130). At this time, the code domain power may indicate the average with respect to the power of the extracted reception symbol. Specifically, the CDP acquisition unit 300 according to an embodiment can acquire the power of the first reception symbol based on the following Eq. (2).

$$P(k;SF,m)=|\hat{S}(k;SF,m)|^2 \qquad [\text{Eq. 2}]$$

Further, the CDP acquisition unit 300 according to an embodiment can acquire the first code domain power $S_{CDP}$ $(SF,m)$, which is the average with respect to the power of the first reception symbol based on the following Eq. (3).

$$S_{CDP(SF,m)} = \frac{SF}{38400} \sum_{k=0}^{\frac{38400-SF}{SF}} P(k;SF,m) \qquad [\text{Eq. 3}]$$

In the same manner, the CDP acquisition unit 300 of the OVSF code estimation apparatus can acquire a second code domain power of the second reception symbol (S135).

After the first code domain power is acquired, the variance acquisition unit 400 of the OVSF code estimation apparatus can determine whether or not the first code domain power is greater than or equal to a predetermined reference value (S140). Here, the reference value can be determined based on the maximum value of the code domain power and the length of the spreading factor. Specifically, the variance acquisition unit 400 can determine the reference value $T_{CDP}$ based on the following Eq. (4).

$$T_{CDP} = CDP_{max} - 3 \times (int)\left[\frac{\log(SF)}{\log(2)} + 0.5\right] \qquad [\text{Eq. 4}]$$

Here, $CDP_{max}$ indicates the maximum CDP value, and int indicates the integer value of the internal calculation value.

If the first code domain power is greater than or equal to the reference value $T_{CDP}$, it is determined that the OVSF code that shares at least a part of the sequence of the candidate OVSF code has been applied to the reception signal. Therefore, the variance acquisition unit 400 of the OVSF code estimation apparatus can acquire the variance of the power of the first reception symbol which is normalized by the first code domain power (S150). Specifically, the variance acquisition unit 400 can acquire the variance of the power of the first reception symbol based on the following Eq. (5).

$$S_{VAR}(SF,m) = Var\left[\frac{P(k;SF,m)}{S_{CDP}(SF,m)}\right] \qquad [\text{Eq. 5}]$$

On the contrary, if the first code domain power is smaller than the reference value $T_{CDP}$, the OVSF code estimation apparatus can proceed to a step of changing the setting of the spreading factor and the index.

In the same manner, the variance acquisition unit 400 of the OVSF code estimation apparatus can determine whether or not the second code domain power is greater than or equal to a predetermined reference value (S145). If the second code domain power is greater than or equal to the reference value, the variance acquisition unit 400 can acquire the variance of the power of the second reception symbol that is normalized by the second code domain power (S155).

If the second code domain power is smaller than the reference value, the OVSF code estimation apparatus can proceed to the next step without acquiring the variance of the power of the second reception symbol.

After the variance of the power of the first reception symbol is acquired, the estimation unit 500 of the OVSF code estimation apparatus can estimate the used OVSF code actually applied to the reception signal based on the variance of the normalized power of the first reception symbol and the variance of the normalized power of the second reception symbol (S160). Specifically, the estimation unit 500 can estimate, as the used OVSF code, the OVSF code corresponding to the smaller variance between the variance of the power of the first reception symbol and the variance of the power of the second reception symbol. This is because as the variance becomes smaller, the possibility in which the corresponding OVSF code was applied to the reception signal becomes higher.

FIGS. 2A and 2B shows the case in which the process of obtaining the variance of the power of the second reception symbol is performed concurrently with the process of obtaining the variance of the power of the first reception symbol. However, it is also possible to obtain the variance of the power of the second reception symbol after the variance of the power of the first reception symbol, or obtain the variance of the power of the second reception symbol during the process of obtaining the variance of the power of the first reception symbol.

After the candidate OVSF code and the parent/child OVSF codes thereof are examined, the above-described processes can be repeated while changing the setting of the spreading factor and the index.

Referring to FIG. 3, the setting unit 600 of the OVSF code estimation apparatus can determine whether or not there is an OVSF code having a parent OVSF code or a child OVSF code that is not used to obtain the variance among a plurality of indices of the set spreading factor (S200). If there is the corresponding OVSF code, the setting unit 600 can change the set index to the index of the OVSF code having the parent OVSF code or the child OVSF code that is not used for obtaining the variance (S210). If the initial value of the set index is 0, the setting unit 600 according to an embodiment can change the set index to the minimum value within an index range.

Next, the OVSF code estimation apparatus can execute the step S110 again. At this time, the extraction unit 200 of the OVSF code estimation apparatus can execute subsequent steps based on the changed index.

On the contrary, if there is no corresponding OVSF code, the setting unit 600 of the OVSF code estimation apparatus can determine whether or not the set spreading factor is greater than a threshold spreading factor (S220). Here, the threshold spreading factor may indicate the minimum spreading factor that is actually used in the OVSF code tree. For example, the threshold spreading factor may be determined to be 4.

If the set spreading factor is greater than the critical spreading factor, the setting unit 600 of the OVSF code estimation apparatus can change the set spreading factor to a spreading factor smaller than the set spreading factor (S230). If the initial value of the set spreading factor is 512, the setting unit 600 according to one embodiment can change the spreading factor of 512 to the spreading factor of 256, which is closest thereto.

Next, the OVSF code estimation apparatus can execute the step S110 again. At this time, the extraction unit 200 of the OVSF code estimation apparatus can execute subsequent steps based on the changed spreading factor.

On the contrary, if the set spreading factor is smaller than or equal to the threshold spreading factor, it is determined that all the candidate OVSF codes have been examined. Therefore, the OVSF code estimation apparatus can terminate the processing.

The configuration of the OVSF code estimation apparatus according to the embodiment of the present disclosure and the OVSF code estimating method executed by the OVSF code estimation apparatus have been described. Hereinafter, the execution result of the OVSF code estimation method executed by the OVSF code estimation apparatus of the present disclosure will be described.

Figure 5:
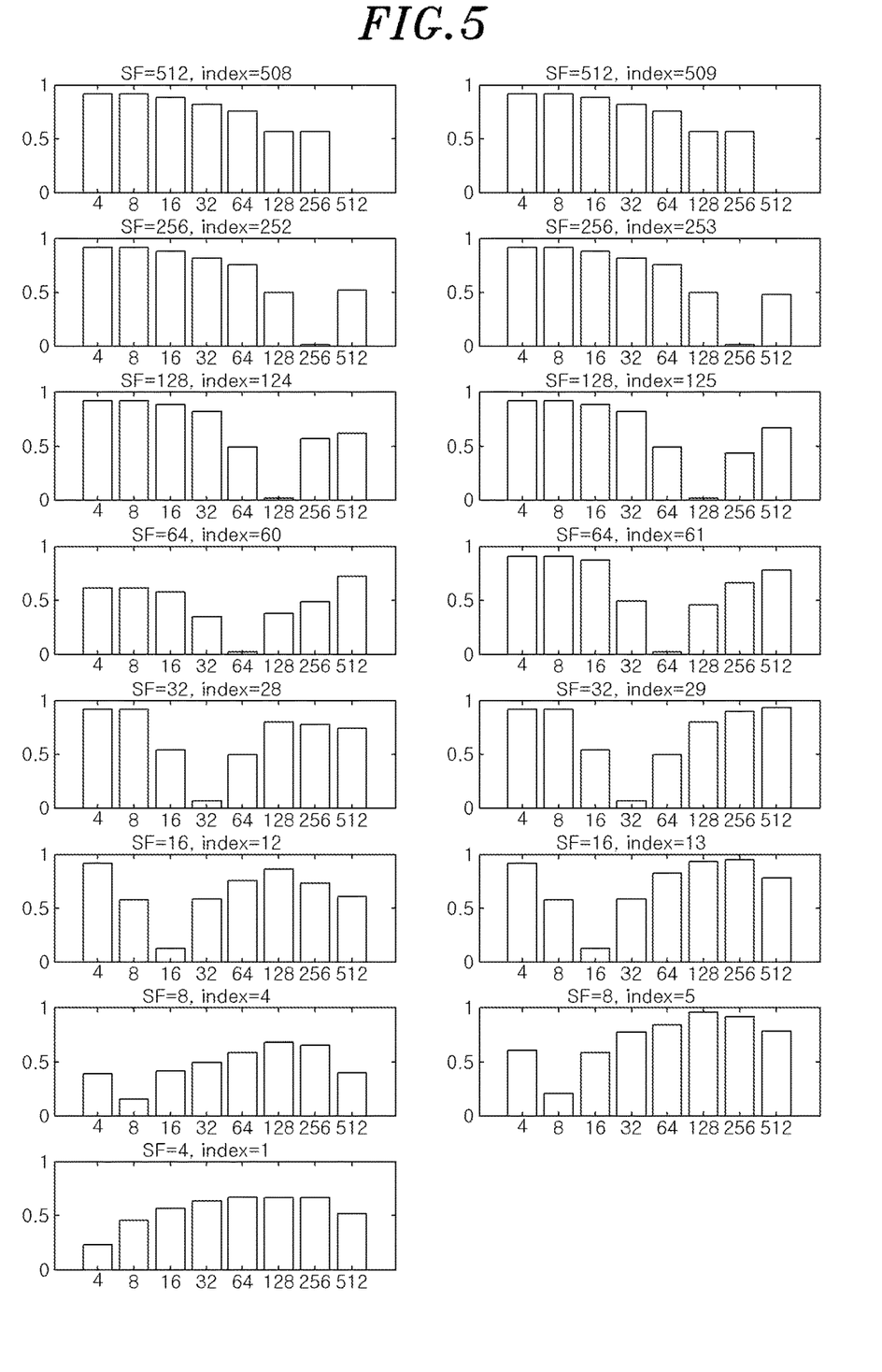
FIG. 5 is a graph showing an execution result of the OVSF code estimation method according to the embodiment of the present disclosure.

FIG. 5 is a graph showing the execution result of the OVSF code estimation method according to an embodiment of the present disclosure.

In order to check the execution result of the OVSF code estimation method according to one embodiment of the present disclosure, OVSF codes shown in Table 1 were used for channelization.

TABLE 1

| Spreading Factor (SF) | Index |
|---|---|
| 512 | 508, 509 |
| 256 | 252, 253 |
| 128 | 124, 125 |
| 64 | 60, 61 |
| 32 | 28, 29 |
| 16 | 12, 13 |
| 8 | 4, 5 |
| 4 | 1 |

Specifically, the OVSF code estimation method according to an embodiment of the present disclosure was applied to a signal obtained by channelizing a plurality of symbols by the OVSF codes shown in Table 1, combining the signal as a chip unit signal, and adding noise. A power ratio of the chip and the noise is −5 dB. Hereinafter, the spreading factor SF and the index are expressed as (SF, Index).

The graph on the upper left side of FIG. 5 shows the variance of the power of the reception symbol that is obtained by dechannelizing a reception signal having a spreading factor SF of 512 and an index of 508 with OVSF codes of (512, 508), (256, 254), (128, 127), (64, 63), (32, 31), (16, 15), (8, 7), and (4, 3) and normalized as the code domain power. The other graphs show similar results. The remaining OVSF codes except the OVSF code of (512, 508) are the parent codes of the OVSF code (512, 508). The variance is lowest when the spreading factor SF is 512. Accordingly, it is estimated that the OVSF code (512, 508) was used in the OVSF code estimation apparatus and the OVSF code estimation method according to the embodiment of the present disclosure.

The above-described OVSF code estimation apparatus and the above-described OVSF code estimation method can accurately estimate the OVSF code applied to the reception signal by using the variance of the power of the reception symbol. Particularly, unlike the method using a ZCR, it is unnecessary to set a reference value, which makes it possible to reduce the possibility in which an error occurs due to the setting of the reference value and improve the performance of the OVSF code estimation.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for estimating orthogonal variable spreading factor (OVSF) code, the method comprising:
   setting an initial value of a spreading factor and an initial value of an index of the spreading factor;
   extracting a first reception symbol by dechannelizing a reception signal based on a candidate OVSF code corresponding to the set spreading factor and the set index;
   acquiring a first code domain power of the first reception symbol;
   acquiring, if the first code domain power is greater than or equal to a predetermined reference value, variance of power of the first reception symbol that is normalized by the first code domain power; and
   estimating a used OVSF code based on the variance of the normalized power of the first reception symbol, comprising:
      extracting a second reception symbol from the reception signal based on a parent OVSF code and a child OVSF code of the candidate OVSF code;
      acquiring a second code domain power of the second reception symbol;
      acquiring, if the second code domain power is greater than or equal to the reference value, variance of power of the second reception symbol that is normalized by the second code domain power; and
      estimating the used OVSF code based on the variance of the normalized power of the first reception symbol and the variance of the normalized power of the second reception symbol wherein an OVSF code corresponding to a smaller variance between the variance of the normalized power of the first reception symbol and the variance of the normalized power of the second reception symbol is estimated as the used OVSF code.

2. The method of claim 1, further comprising, after said estimating the used OVSF code, changing at least one of the set spreading factor and the set index.

3. The method of claim 2, wherein said changing at least one of the set spreading factor and the set index includes:
   changing the set index to an index of an OVSF code having a parent OVSF code or a child OVSF code that is not used for acquiring the variance among a plurality of indices of the set spreading factor.

4. The method of claim 2, wherein said changing at least one of the set spreading factor and the set index includes:
   changing, when there is no OVSF code having a parent OVSF code or a child OVSF code that is not used for acquiring the variance among a plurality of OVSF codes corresponding to the set spreading factor, the set spreading factor to a spreading factor smaller than the set spreading factor.

5. The method of claim 4, wherein said changing at least one of the set spreading factor and the set index further includes:
stopping changing of the set spreading factor when the set spreading factor is smaller than or equal to a predetermined threshold spreading factor.

6. The method of claim 2, wherein in said extracting the first reception symbol, if at least one of the set spreading factor and the set index is changed, the first reception symbol is extracted based on the changed setting.

7. An apparatus for estimating orthogonal variable spreading factor (OVSF) code, the apparatus comprising:
a receiver configured to receive a signal; and
a processor configured to control the receiver, wherein the processor is further configured to:
set an initial value of a spreading factor and an initial value of an index of the spreading factor;
extract a first reception symbol by dechannelizing the reception signal based on a candidate OVSF code corresponding to the set spreading factor and the set index;
acquire a first code domain power of the first reception symbol;
acquire, when the first code domain power is greater than or equal to a predetermined reference value, variance of a power of the first reception symbol that is normalized by the first code domain power; and
estimate a used OVSF code based on the variance of the normalized power of the first reception symbol by:
extracting a second reception symbol from the reception signal based on a parent OVSF code and a child OVSF code of the candidate OVSF code;
acquiring a second code domain power of the second reception symbol;
acquiring, if the second code domain power is greater than or equal to the reference value, variance of power of the second reception symbol that is normalized by the second code domain power; and
estimating the used OVSF code based on the variance of the normalized power of the first reception symbol and the variance of the normalized power of the second reception symbol wherein an OVSF code corresponding to a smaller variance between the variance of the normalized power of the first reception symbol and the variance of the normalized power of the second reception symbol is estimated as the used OVSF code.

8. A non-transitory computer-readable storage medium including computer-executable instructions, which cause, when executed by a processor, the processor to perform a method for estimating orthogonal variable spreading factor (OVSF) code, the method comprising:
setting an initial value of a spreading factor and an initial value of an index of the spreading factor;
extracting a first reception symbol by dechannelizing a reception signal based on a candidate OVSF code corresponding to the set spreading factor and the set index;
acquiring a first code domain power of the first reception symbol;
acquiring, if the first code domain power is greater than or equal to a predetermined reference value, variance of power of the first reception symbol that is normalized by the first code domain power; and
estimating a used OVSF code based on the variance of the normalized power of the first reception symbol by:
extracting a second reception symbol from the reception signal based on a parent OVSF code and a child OVSF code of the candidate OVSF code;
acquiring a second code domain power of the second reception symbol;
acquiring, if the second code domain power is greater than or equal to the reference value, variance of power of the second reception symbol that is normalized by the second code domain power; and
estimating the used OVSF code based on the variance of the normalized power of the first reception symbol and the variance of the normalized power of the second reception symbol wherein an OVSF code corresponding to a smaller variance between the variance of the normalized power of the first reception symbol and the variance of the normalized power of the second reception symbol is estimated as the used OVSF code.

* * * * *